Jan. 9, 1968
H. P. CORDES
3,362,581
DISPENSING APPARATUS WITH ADJUSTABLE
RESILIENT DISTRIBUTION MEANS
Filed Oct. 7, 1966
3 Sheets-Sheet 1
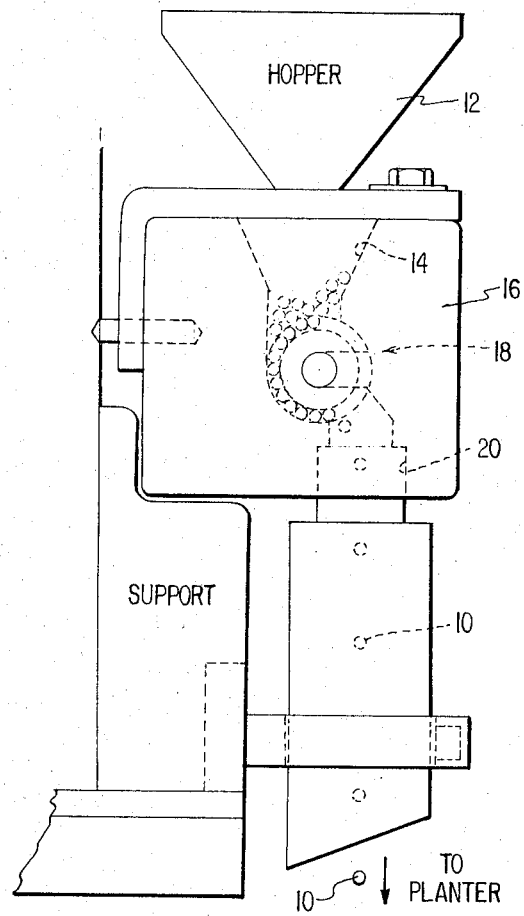
FIG. 1
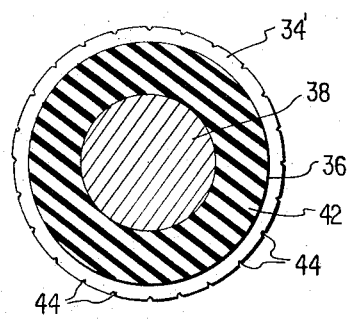
FIG. 6
FIG. 5
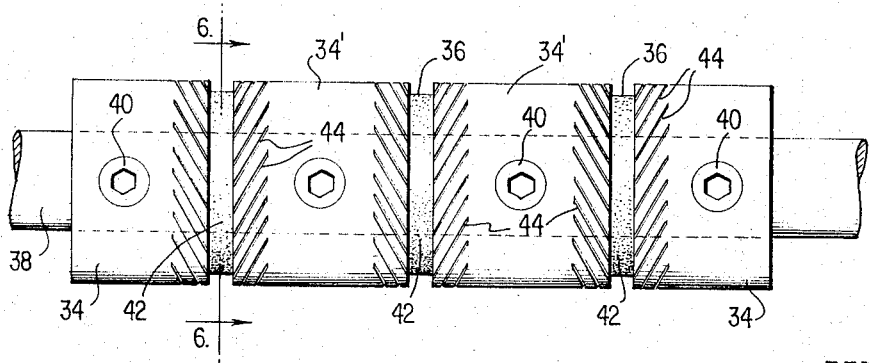
INVENTOR
HENRY P CORDES
BY McLean, Morton & Boustead
ATTORNEYS

INVENTOR
HENRY P CORDES

BY

ATTORNEYS.

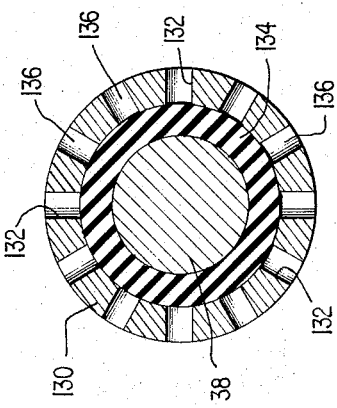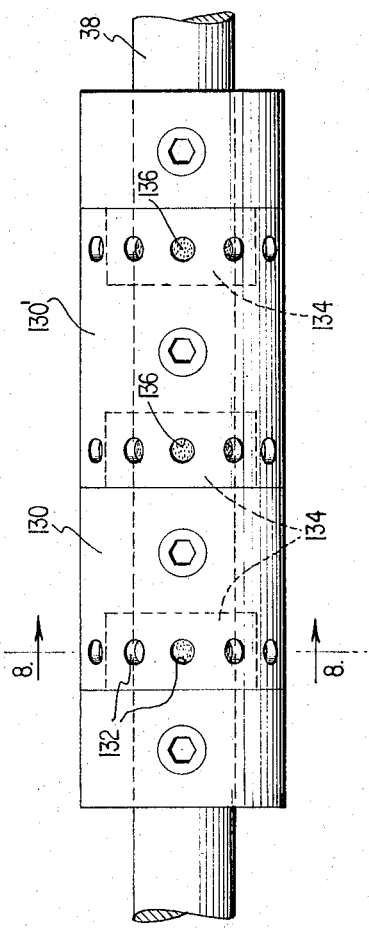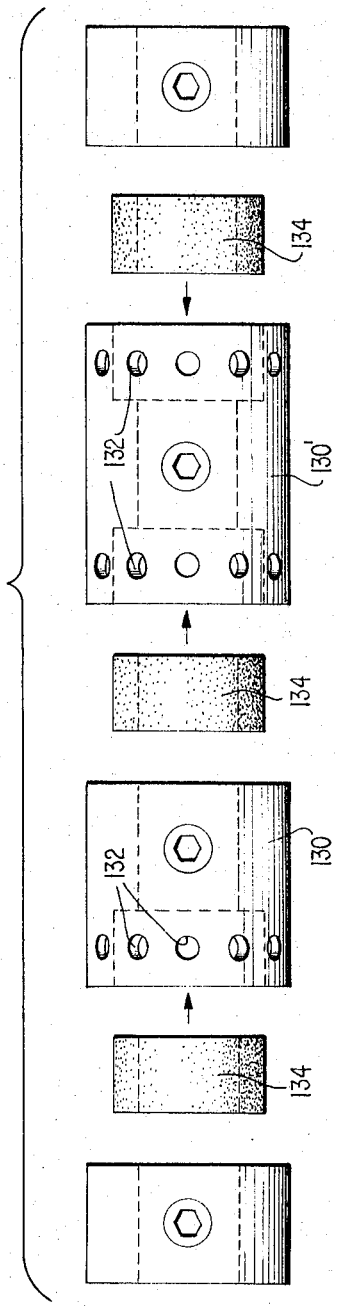

United States Patent Office 3,362,581
Patented Jan. 9, 1968

3,362,581
DISPENSING APPARATUS WITH ADJUSTABLE
RESILIENT DISTRIBUTION MEANS
Henry P. Cordes, Vacaville, Calif., assignor to
Basic Vegetable Products, Inc.
Filed Oct. 7, 1966, Ser. No. 585,200
8 Claims. (Cl. 221—241)

This invention relates to an adjustable, non-damaging resilient distribution cell for small articles of irregular shape and size and more particularly to a seed distribution cell which dispenses all sizes and shapes of seed without damage thereto and at a uniform desired rate in single file for planting.

The conventional seed planter has a positive displacement seed distribution cell which is, for example, formed by a pocket in the rotating shaft. Such seed distribution cells, however, have several disadvantages. Seeds vary greatly in size and if only one seed at a time is to be dispensed, the pockets used must be closely sized to the particular seed, thereby requiring a multitude of separate assemblies, one for each size of seed. If the size of the pocket is not closely adjusted to the individual seed, either the seed will not fit into the pocket, or several seeds will fit into one pocket and be discharged in multiple lots. Even when the seed pocket is approximately the size of the seed, often a part of a seed protrudes and is cracked or broken as the seed passes through the feeder mechanism thus destroying germination.

The cell of this invention overcomes these disadvantages by providing an assembly which adjusts itself to moderate ranges of seed sizes. In general, this invention comprises a seed distributing cell mounted on a shaft which rotates within a cell block. The sides of the seed cell are adjustable metal rings mounted on a cenrtal shaft and the bottom of the cell is a resilient, e.g., rubber ring mounted on the central shaft and smaller in diameter than the side metal rings with which it is in contact. The seed cell is completed by the cell block which houses the shaft. The seed cell can be narrowed and decreased in depth by compressing the rubber ring between the adjustable side metal rings through the application of pressure from the metal rings. Individual seeds are fed to an inlet opening in the cell block, picked up by the seed cell and carried single file supported by the resilient ring and released through an outlet opening in the bottom of the cell block, e.g. approximately 180° from the point of entry, from which the seeds fall by gravity to a planter. The speed of rotation of the central shaft controls the rate at which the seeds are discharged from the cell. In another form, the cell may be compartmented to widely space the discharge of the seeds. The resilient bottom of the seed cell prevents double feeding and damage during rotation of the shaft and also ejects the seed at the discharge point thereby preventing carryback. The width and depth of the seed cell can be simultaneously adjusted in an infinite range by moving the adjustable side rings. If larger variations of the size of the seed cell are desired, they may be obtained by selecting a resilient ring of desired width and thickness. Although seed dispensers using resilient rotary feeding elements have been used heretofore, (see, for example, U.S. Patent 2,237,504) none has used a resilient ring element mounted as described above to form a continuous seed distribution cell having means for providing a variable size and shape distribution path such that the cell is adaptable to various sizes and shapes of seeds without damage thereto.

It is accordingly a primary object of this invention to provide a seed distribution cell which can be adjusted simply and quickly to accommodate a wide range of seed sizes and shapes. It is a further object of this invention to provide a seed distribution cell which has a resilient surface which can be compressed by the seed without damage to the seed to provide instantly a cell adjustable for small variation in seed sizes and shapes. It is another object of this invention to provide a seed cell which can supply undamaged seeds of any size in single file at any desired rate for planting. A still further object is to provide a compartmented seed cell with a resilient surface capable of dispensing uniform articles such as pelleted seed singly without damage at any desired rate.

The manner in which the foregoing and other objects of this invention are accomplished will be apparent from the detailed description hereinbelow together with the appended drawings in which:

FIGURE 1 is a side elevation showing the seed distribution cell as it would be mounted on a planter;

FIGURE 5 is an enlarged view of the rotary core of the seed cell assembly of FIGURES 2–4;

FIGURE 6 is a cross-section of FIGURE 5 taken perpendicular to the axis of the cell along line A—A in FIGURE 5;

FIGURE 7 is an enlarged view of a compartmented variation of the seed cell assembly of FIGURE 1 for use with uniform pelleted seed;

FIGURE 8 is a sectional view of the cell of FIGURE 7 taken perpendicular to the axis of the cell along line B—B in FIGURE 7; and FIGURE 9 is an expanded view of the components of the seed cell assembly shown in FIGURE 7.

Figure 2:
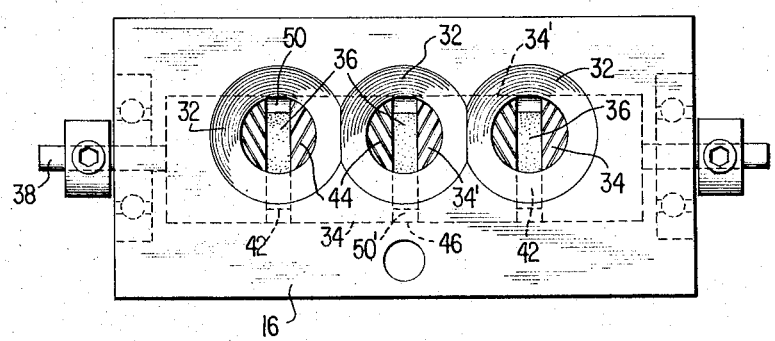
FIGURES 2 through 4 show respectively, top, side and bottom views of a preferred form of the seed cell block assembly used in FIGURE 1.

Referring now to FIGURE 1, seeds 10 feed from hopper 12 by gravity into an opening 14 in cell block 16 where they contact the surface of the rotary core assembly 18 which forms the basis of this invention. The core assembly 18 passes the seeds individually around the cell block to discharge opening 20 from which the seeds fall by gravity to a planter (not shown).

Figure 3:
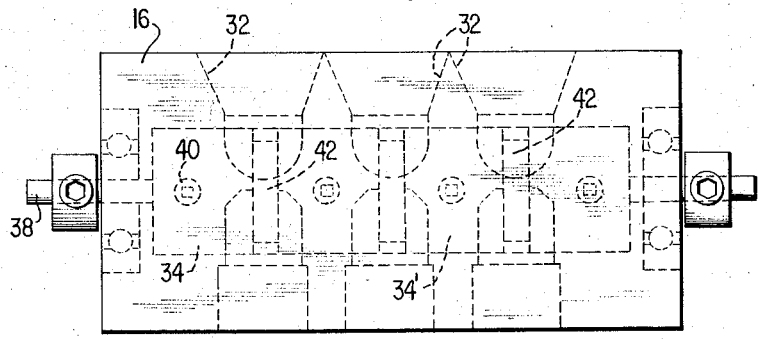
Figure 4:
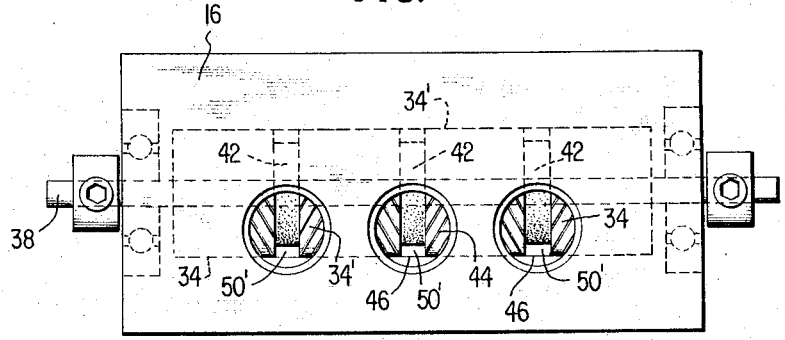

FIGURES 2 through 4 show a preferred embodiment of the cell block and rotary core assembly having three side-by-side seed cells as used, for example, to distribute three streams of onion seed to planting shoes (not shown). The number of cells may, of course, vary substantially and is not critical to this invention. Seeds from hopper 12, for example, enter the cell block 16 by openings 14 formed by countersunk holes 32, contact adjustable ribbed cell side rings 34 and fall onto the surfaces 36 of resilient rings 42. The adjustable ribbed cell side wall rings 34 as shown in more detail in FIGURE 5, are metal and are adjustably secured to shaft 38 by set screws 40. Resilient rings 42 can, if desired, be formed by a ring having a resilient surface. The edges of side wall rings 34 are ribbed at 44 to facilitate the feeding of seeds to the resilient surfaces 36. Since the two middle rings 34' abut two of the resilient rings 42, they are ribbed on both ends. Rings 34' can also be somewhat larger than rings 34, if desired. Resilient rings 42 also are fitted around shaft 9 which is powered by a source (not shown) to rotate the core at any desired speed. The depth of the seed distribution passage, see top opening 50 of the seed cell or channel (FIGURE 2) or bottom opening 50′ (FIGURE 4), in cell 30 is adjustable by the diameter of the resilient ring 8 which can be increased by squeezing it between the side wall ribbed rings 34 which fit over shaft 9 and which have a diameter slightly less than the opening in the core block 30. If larger changes in diameter of the resilient rings 42 are desired than can be obtained by the pressure exerted on the resilient rings, resilient rings of different diameter and/or width can quickly be substituted for rings 42.

In operation, extreme accuracy can be realized with the continuous resilient rotary assembly as shown in FIGURE 5 by adjusting the width and depth of the cell opening 50 to accommodate the size seed which will be added to the feed hopper. The width of the cell is infinitely variable by moving metal side rings 34, 34′ and locking them into the desired position by tightening set screws 40 and the depth of the seed cell or channel is controlled by the outer diameter of the resilient rings 42 which are held securely between metal rings 34, 34′. The seed cell assembly is rotated independently of the movement of the planter. By varying the rotational speed of the cell assembly, the desired number of seeds per unit of time can be deposited in uniform single order. Additional accuracy of distribution can, of course, be obtained by grading the seed for size prior to adding to the feed hopper. If the seed stock varies greatly in size, this pre-sizing would be necessary to prevent multiple feeds and damage to the seeds.

As the seed falls from the hopper (see FIGURE 1), it passes through an opening 12, i.e. hole 32, falls onto surface 36 and is carried to top opening 50 of the seed distribution channel. The cell has been adjusted in size so that it is not possible for more than one seed at a time to enter opening 50. The adjustment also allows a slight pressure to be exerted on the seed between the surface 36 of resilient ring 42 and the wall 46 of cell block 16. This pressure deforms the resilient ring 42 slightly and provides the necessary traction to provide progression and positive feed. As the seeds progress, they pass to outlet opening 50′ in block 16, as shown in FIGURE 4, where they discharge by gravity and resilience of ring 42 and fall uniformly to the attached planting equipment (not shown).

A modified seed cell assembly having compartmented single seed cells is shown in FIGURES 7 through 9. This variation is useful, particularly with pelleted seeds of uniform size, when wide seed spacings are desired. In this variation, only the cell depth is adjustable by changing the diameter of the resilient ring. As shown best in FIGURE 9, in this modification adjustable metal rings 130 and 130′ are drilled to form circular openings 132 which constitute the cell side walls. Rings 130 and 130′ are also counterbored to fit over resilient rings 134 which are of smaller diameter and which function as the bottom of the distribution openings 136 (see FIGURE 7). Rings 130 and 130′ and resilient rings 134 are attached to shaft 136. The resiliency of rings 134 in this seed distribution cell provides adjustability in depth for seed openings 136 which is accomplished by varying the outer diameter of the resilient ring through the pressure applied by rings 130, 130′. The cell width and length are controlled by the size of the holes 132 drilled in rings 130 and 130′. The depth of the seed openings 136 can also be varied by substituting resilient rings 134 of varying diameter. The drilled holes 132 in this arrangement are large enough to hold one seed or pellet and small enough to exclude a second seed or pellet. This variation allows extreme accuracy in instances where a very low number of seeds per unit of time is desired. In addition to varying the rate of seeds by varying the rotational speed of the assembly, the number of drilled holes 132 in the metal rings 130 and 130′ can be varied.

Although the drawings specifically apply to a multiple cell unit, having three feed lines, this invention is equally useful for any seeds, or other articles, which are to be dispensed uniformly at a controlled rate in undamaged condition from any number of feed lines.

It is claimed:

1. Apparatus for dispensing articles singly and at a uniform rate comprising cell block means having a bore therein with inlet and outlet openings allowing feed and discharge of articles to and from said bore, hopper means for feeding the articles to said inlet opening, and a rotary cell assembly in said bore for moving the articles around the bore from said inlet opening to said outlet opening singly at a uniform rate comprising rotatable shaft means, at least one resilient ring mounted on said shaft means, at least two mental rings slideably mounted on said shaft means each slightly smaller in diameter than said bore and larger in diameter than said resilient ring, said metal rings being in contact with the opposite sides of said resilient ring and forming therebetween a distribution channel for the article having as its bottom the surface of said resilient ring, and means to lock the said metal rings to said shaft means at a desired position thereon, the diameter of said resilient ring being variable according to the pressure applied thereon by said metal rings.

2. Apparatus as defined in claim 1 wherein the distance between the slideably mounted metal rings on said shaft means accommodate the maximum width or depth of the articles being dispensed and is close enough to prevent more than one said article side by side on the surface of said resilient ring and in which the diameter of the resilient ring provides a distribution channel deep enough to allow passage of the article to the outlet opening without damage and small enough to maintain contact between the article with the surface of said resilient ring on one side and with the wall of the bore in said cell block means on the other side.

3. Apparatus as defined in claim 1 wherein said inlet opening is wider than said distribution channel and the upper surfaces of said metal rings are ribbed adjacent the resilient rings to facilitate the feeding of articles to the surface of said resilient rings.

4. Apparatus as defined in claim 1 wherein there are a plurality of said resilient rings and associated metal rings mounted on said shaft means forming a plurality of distribution channels.

5. Apparatus for dispensing articles singly and at a uniform rate comprising cell block means having a bore therein with inlet and outlet openings to accommodate the feed and discharge of the articles to and from said bore, hopper means for feeding the articles to said inlet opening, a rotary cell assembly in said bore for moving said articles around the bore from said inlet opening to said outlet opening singly at a uniform rate including rotatable shaft means, at least one resilient ring mounted on said shaft means, at least two metal rings including one ring having a recess in at least one end thereof coaxial with said shaft means, said metal rings being slideably mounted on said shaft means in such a manner that the metal rings press against the opposite sides of said resilient ring and said resilient ring is fitted into said recess, said one metal ring having openings drilled into said recess of a size to accommodate one of said articles thereby forming together with the surface of said resilient ring a distribution having a plurality of compartments each of which has a portion of the resilient surface as its bottom and the drilled holes as its sides, the depth of said compartments being variable according to the pressure applied on said resilient ring by said metal rings.

6. Apparatus for dispensing articles as defined in claim 5 wherein said drilled openings in the one metal ring are large enough to accommodate one said article and small enough to prevent more than one of such articles to enter said compartment and in which the depth of the compartment is sufficient to allow one article to be rotated to the discharge opening without damage and small enough to maintain contact between the article with the surface of said resilient ring on one side and with the wall of the bore in said cell block means on the other side.

7. Apparatus as defined in claim 5 wherein said inlet opening is wider than said distribution channel and the upper surfaces of said metal rings are ribbed adjacent the resilient rings to facilitate the feeding of articles to the surface of said resilient rings.

8. Apparatus as defined in claim 5 wherein there are a plurality of said resilient rings and associated metal rings mounted on said shaft means forming a plurality of distribution channels.

References Cited
UNITED STATES PATENTS

| | | | |
|---|---|---|---|
| 1,750,310 | 3/1930 | Jonkel et al. | 221—277 X |
| 3,163,333 | 12/1964 | Lindaberry | 222—274 X |

STANLEY H. TOLLBERG, *Primary Examiner.*